(12) United States Patent
Kumar

(10) Patent No.: US 11,212,392 B2
(45) Date of Patent: Dec. 28, 2021

(54) METHODS AND DEVICES FOR USING A UNIFORM APPLICATION PROGRAM INTERFACE FOR VALIDATION AND RECOVERY

(71) Applicant: Verizon Patent and Licensing Inc., Arlington, VA (US)

(72) Inventor: Sunil Kumar, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/663,674

(22) Filed: Oct. 25, 2019

(65) Prior Publication Data

US 2021/0127014 A1 Apr. 29, 2021

(51) Int. Cl.
*H04M 7/00* (2006.01)
*G06F 9/54* (2006.01)

(52) U.S. Cl.
CPC .......... *H04M 7/0084* (2013.01); *G06F 9/547* (2013.01); *H04M 7/0066* (2013.01)

(58) Field of Classification Search
CPC .... H04M 7/0084; H04M 7/0066; G06F 9/547
See application file for complete search history.

(56) References Cited

U.S. PATENT DOCUMENTS

| | | | |
|---|---|---|---|
| 10,719,373 B1* | 7/2020 | Koponen | H04L 9/0891 |
| 2019/0149424 A1* | 5/2019 | O'Neill | G06F 11/3428 |
| | | | 709/224 |
| 2019/0377611 A1* | 12/2019 | Khan | G06Q 10/06315 |

* cited by examiner

*Primary Examiner* — Duc C Ho

(57) ABSTRACT

A device may receive, from a source device, a request for a target device to perform an operation. The request includes parameters, source information that identifies the source device, and operation information that identifies an operation. The request invokes an API that selects, based on the source information and the operation information, validation rules. The API executes the validation rules to determine whether the parameters are valid for the operation. The API may determine, from executing the validation rules, that an issue is preventing the parameters from being valid for the operation. The API may select, based on the source information and the operation information, a recovery rule from among a plurality of recovery rules. The API may execute the recovery rule to remedy the issue and provide a response message indicating a result of executing the recovery rule.

20 Claims, 11 Drawing Sheets

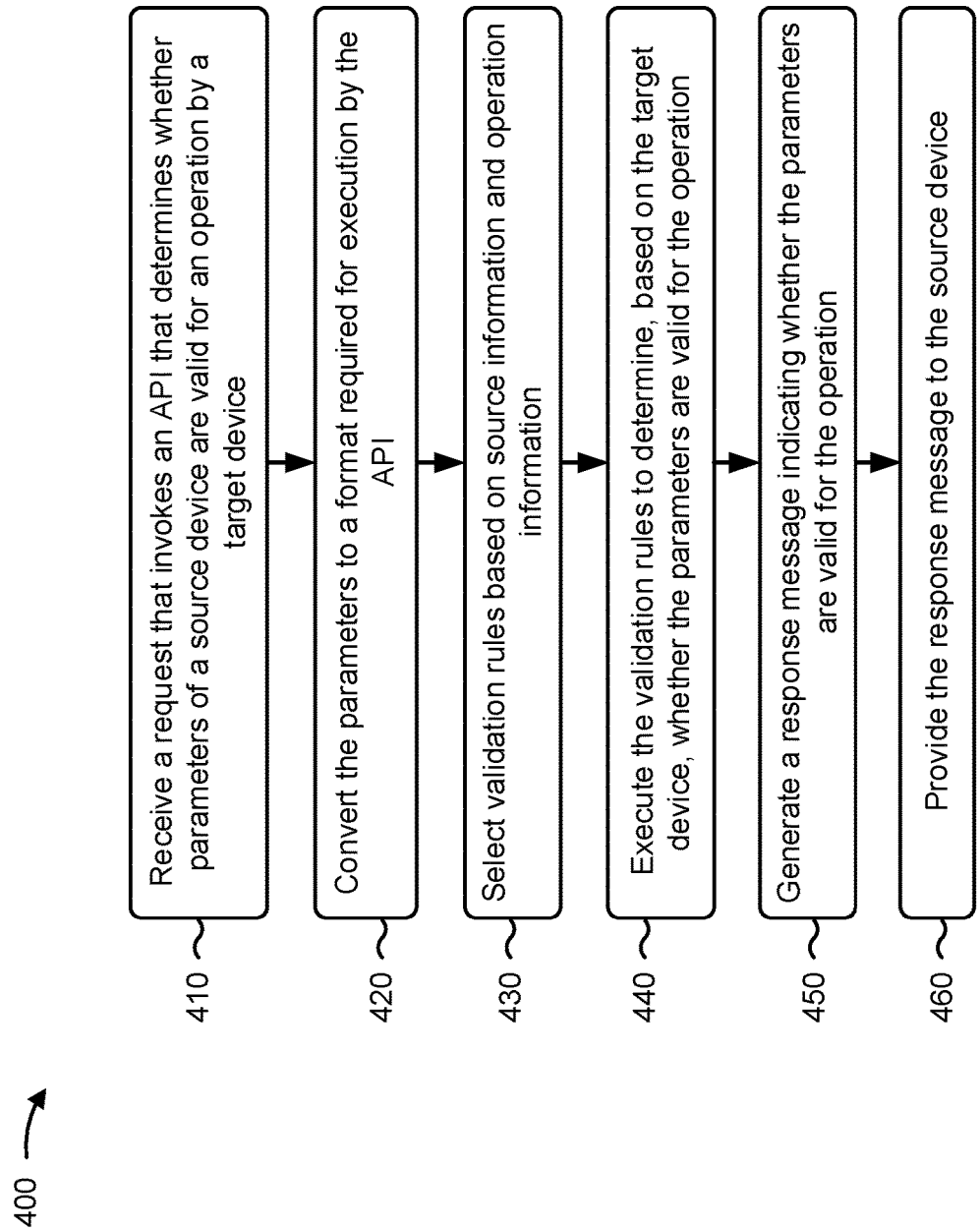

METHODS AND DEVICES FOR USING A UNIFORM APPLICATION PROGRAM INTERFACE FOR VALIDATION AND RECOVERY

BACKGROUND

A complex workflow may involve interactions among multiple systems in which information is passed to each system to achieve the desired end result. One example of such a complex workflow is a provisioning process for network-provided services. The provisioning process may involve multiple systems, such as an ordering system, a provisioning system, systems controlling individual network elements, a service manager system, and billing systems, to name a few. Examples of network service that require a provisioning process are a voice telephony service and an Internet Service Provider service.

BRIEF DESCRIPTION OF THE DRAWINGS

FIG. 4 is a flow chart of an example process for using a uniform application program interface for validating parameters of a source device for an operation on a target device.

DETAILED DESCRIPTION OF PREFERRED EMBODIMENTS

Figure 1A:
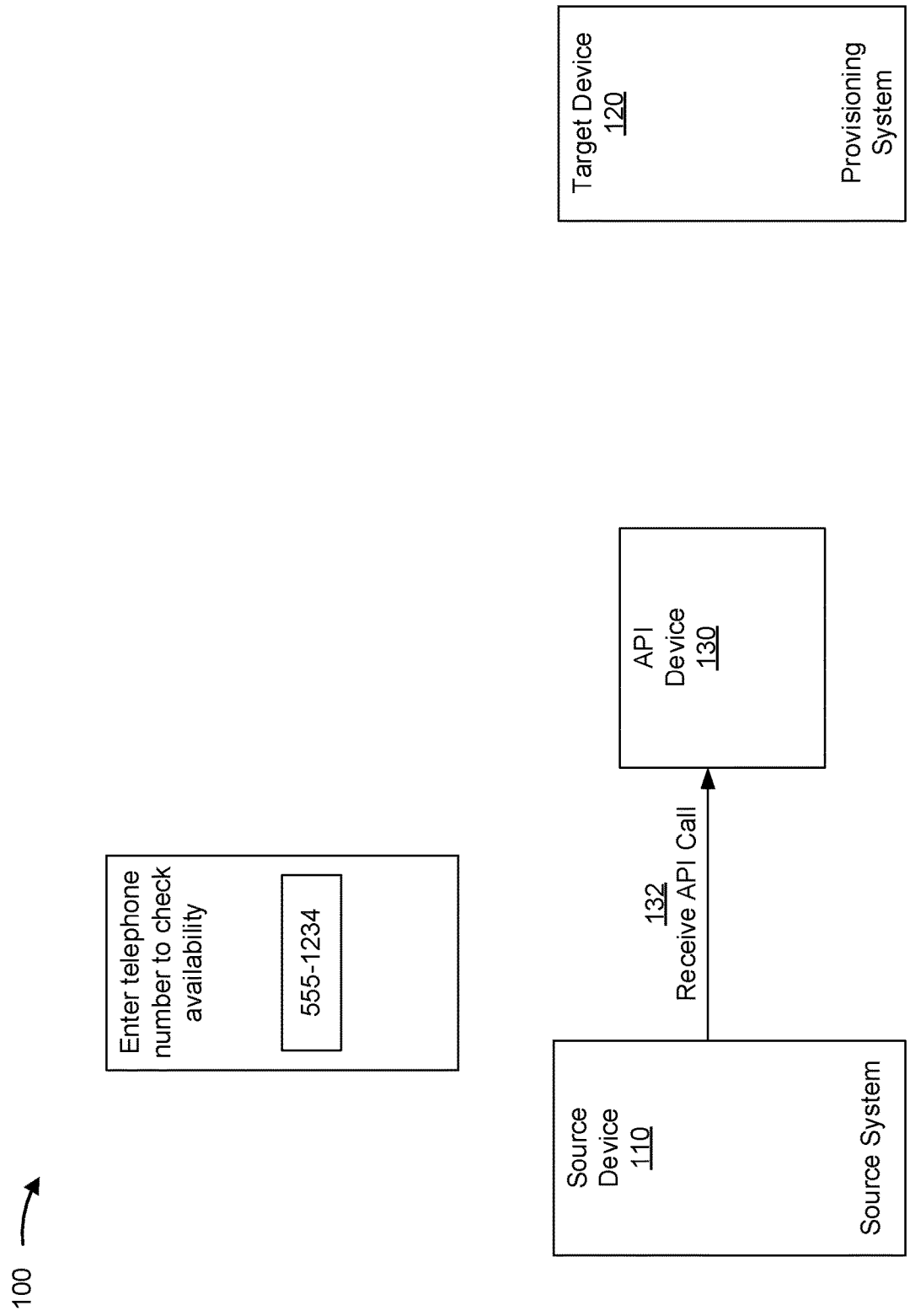
FIGS. 1A-1H are diagrams of one or more example implementations described herein.

The following detailed description of example implementations refers to the accompanying drawings. The same reference numbers in different drawings may identify the same or similar elements.

Complex workflows typically involve multiple systems interacting to achieve the desired result of the workflow. An example of a complex workflow is a provisioning process whereby services are provisioned for use by end users. Where services are provided using network elements, multiple systems may be impacted in providing the service to the end user. For example, an ordering system may be used as a front end system to initiate the provisioning process, a provisioning system may be used to orchestrate the provisioning process, network elements may have systems associated with tracking their configurations and performance, services may have systems that maintain user credentials, account information, services policies, and other service-related information, and usage tracking systems may store usage information for accounting purposes. These multiple systems may be implemented using different underlying technologies, which themselves may evolve over time as systems are improved, equipment fails or is otherwise replaced, and technology changes. As a result, interfaces to these systems may vary, such that information passed between systems to achieve an end result may need to be reformatted or otherwise interpreted based on each specific system's requirements.

Additionally, the information tracked by each system may not always be consistent between systems. For example, network element systems may operate autonomously from usage tracking systems and/or provisioning systems, such that over time they may become misconfigured for various reasons. Inconsistent information may cause a failure of the workflow when conditions (e.g., rules) which are expected to be true at each system are reflected as false in one or more of the actual systems involved in the workflow.

As a specific example, an ordering system may provide a front end for provisioning a network service such as a voice over internet protocol (VOIP) telephony service, over a network to end users (customers). In such a case, the ordering system—referred to herein as a source device or source system—may send a request to a target device or target system that is part of the provisioning workflow to perform an operation, and the request may include one or more parameters. For example, in the case of the VOIP service, the target system may be a provisioning system, the operation may be the assignment of a new telephone number to an end user, and a parameter for the operation may be a requested telephone number. The target device may use validation rules associated with its system to determine whether a parameter is valid for the operation. For example, in the case of a VoIP service, the target device may use validation rules to determine if a telephone number database indicates that the telephone number is available for assignment to an end user. If the telephone number is not available, the target device cannot provision the telephone number, so the requested telephone number is considered to be invalid and results in an operation fault. If the parameter is valid, the operation is performed by the target system, generating a result. The result may then be passed to the next system in the workflow, along with other parameters needed by such system, and similar validation processing may be applied. If any of the parameters used in these downstream systems are found to invalid, that may cause the workflow to fault and not complete. For example, in the case of the VoIP service, if a second target system in the provisioning workflow finds that the requested telephone number is marked as in use in that system (and therefore assignment to a new end use is invalid), the second target system will refuse the operation and the workflow will not complete.

The interdependence of workflow operations across multiple systems can result in failure at the end of the workflow, which can result in significant wasted time and computing resources, both from the workflow process that was unable to complete as well as the investigation and data verification needed to correct the inconsistency causing the fault.

According to some implementations herein, a source device may invoke an application program interface (API) that is configured to validate parameters (e.g., telephone number, domain name, new enterprise information, and/or the like) for an operation to be performed by a target device (e.g., a system involved in a provisioning process), prior to the target device performing the operation. The API may be executed on an API device and may be a uniform API that is configured to validate parameters regardless of a type of the source device and without requiring changes in production software of the target device or throughout the multiple systems associated with the target device. The API may use source information about the source device and operation information about the operation to determine how to handle the parameters and determine which validation rules to use for a particular type of source device. There may be different types of source devices because there may be different workflows that involve different source systems and use the same target systems. Each of the source systems may provide parameters for operation requests differently. The API may use the parameters and the source information to execute one or more validation rules that are specific to a target system that can carry out the operation. Furthermore, the API is able to access recovery rules to remedy an issue based on a type of the source device and the operation information.

The API may be dynamic in that the API device may add parameter maps (indicating how to handle different parameter formats), validation rules, and/or recovery rules for each new type of source device and for any target device without changing the API. As a result, the target device of the provisioning system may not have to spend time, networking, and processing resources (e.g., processor resources, memory resources, power resources, and/or the like) updating input parameter rules, validation rules, and/or recovery rules throughout production software of the target system. An update to the production software is no small undertaking. The update may take a substantial amount of time to implement (e.g., 5-10 days). The update may also take a substantial amount of networking and processing resources (e.g., processor resources, memory resources, power resources and/or the like), because the production software may need to be updated on multiple devices of the provisioning system. The API device may save these resources.

Furthermore, the API device may immediately validate (and repair if necessary) a parameter for a requested operation. The target device may save networking and processing resources that may be wasted investigating an issue discovered by validation rules late into a first time of performing the operation, resolving the issue, and/or performing the operation for a second time.

FIGS. 1A-1H are diagrams of one or more example implementations 100 described herein. FIG. 1A illustrates a source device 110 of a source system that may provide a request for an operation to be performed by a target device 120 of a provisioning system. In this example, the source system may be an ordering system, the operation may be a request for a new telephone number at a customer site, and the target system may be a provisioning system of a network that may provide the telephone number. In some examples, the source system, the operation, and/or the target system may be different from the example described herein.

Source device 110 may provide the request to API device 130 to validate a parameter in the request for the operation, before target device 120 performs the operation. API device 130 may be an intended target of the request or API device 130 may intercept a request addressed to target device 120. The parameter in this example may be the telephone number, such as "555-555-1234."

As shown by reference number 132, API device 130 may receive the request as an API call. API device 130 may invoke an API that is configured to determine if the telephone number in the request is valid for the operation to be performed by target device 120. The API may be configured to not only validate the telephone number, but also use a recovery rule to correct or remedy an issue that is preventing the telephone number from being valid.

Figure 1B:
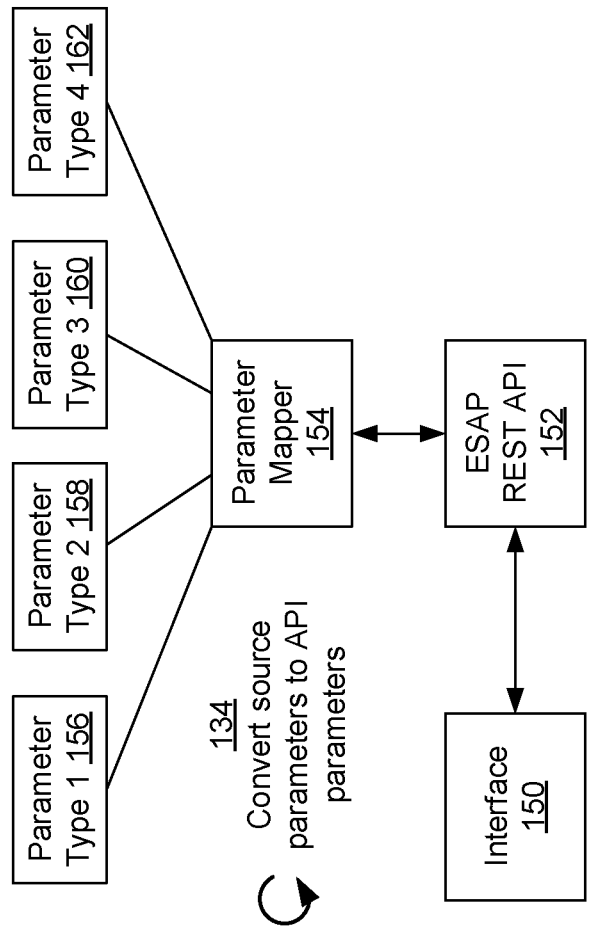

As shown by FIG. 1B, the API may receive the request through interface 150. The API may be an efficient and secure authentication protocol (ESAP) representational state transfer (REST) API to securely control operations of the API. A REST API may send and receive messages using hypertext transfer protocol (HTTP). This REST API may be shown by ESAP REST API 152. While ESAP REST API 152 is shown as a separate block from other blocks in FIGS. 1B, 1C, and 1E, the API may include EAP REST API 152 and the other blocks. In some implementations, the API may be considered the ESAP REST API 152, but the API controls and/or directs the other blocks.

As shown by reference number 134, API device 130 may execute the API to convert the parameter in the request to an API parameter that is in a format to be used for execution by the API. For example, source device 110 may include the new telephone number in a format of "555-555-1234," but another source device (of a different source type) may include the new telephone number in a format of "555.555.1234." The API parameter may be a common format used for execution of validation rules. In some implementations, the format of the API parameter may be based on the target device. Note that while the API is described as performing various operations, API device 130 is executing the API and all associated components of the API shown in FIGS. 1B, 1C, and 1E.

The request may include source information that identifies source device 110 and/or identifies a type of source device 110. The API executed by API device 130 may use the source information to convert the telephone number to an API parameter format. As shown by reference number 134, the API may use a parameter mapper 154 to convert the telephone number to the API parameter format. The API may select a parameter map from among multiple parameter maps of parameter types 156, 158, 160, 162, based on the source information, and convert the telephone number to the API parameter format. New parameter maps for new types of parameters may be added to the parameter maps from which parameter mapper 154 selects and/or old parameter maps for existing types of parameters may be removed from the parameter maps from which parameter mapper 154 selects.

Figure 1C:
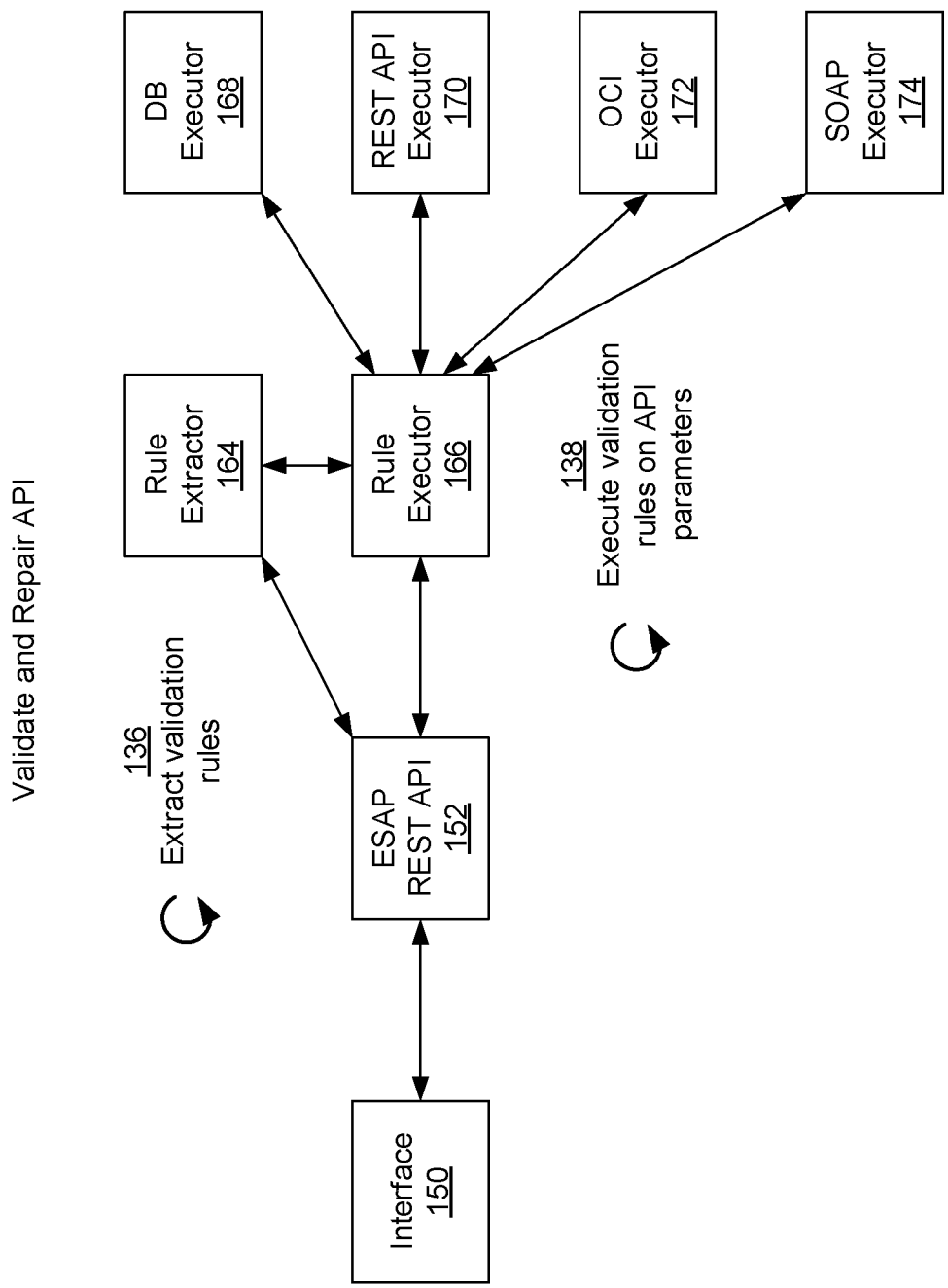

As shown by FIG. 1C and by reference number 136, the API may use rule extractor 164 to extract validation rules from among multiple validation rules, where each validation rule specifies how to determine whether the one or more API parameters are valid for the operation. In some implementations, each validation rule corresponds to a respective type of source device. In some implementations, each validation rule may correspond to a particular target device.

In some implementations, rule extractor 164 may extract validation rules from among database rules, REST rules, simple object access protocol (SOAP) rules, and/or Oracle® call interface (OCI) rules. Rule extractor 164 may have database credentials or may be able to obtain the database credentials. The API may use rule extractor 164 to select validation rules from among multiple validation rules, based on source information and operation information included in the request. The source information identifies source device 110 and a type of source device 110. The operation information identifies the operation, which in this case is a provision of the telephone number.

As shown by reference number 138, the API may execute the validation rules on the parameter (converted to an API parameter format). The API may use rule executor 166 to execute the validation rules. This may involve using an appropriate component or extractor. For example, rule executor 166 may execute the validation rules by invoking a database query to determine whether the one or more API parameters are valid for the operation. That is, a database (DB) executor 168 may query databases in one or more network elements to determine if the telephone number is available for use. This may involve dynamic binding of structured query language (SQL) queries. Dynamic binding enables database queries to insert parameters to search for at runtime, such as the parameter in the API parameter format. Rule executor 166 may have access to databases of the target system, or of any relevant components of the target system.

This may include use of database credentials to access a database to validate a parameter.

In some implementations, rule executor 166 may use a REST API executor 170 to invoke a REST call to determine whether the telephone number is valid for the operation. Rule executor 166 may use an OCI executor 172 to invoke an OCI call to determine whether the telephone number is valid for the operation. Rule executor 166 may use a SOAP executor 174 to invoke a SOAP call to determine whether the telephone number is valid for the operation. Rule executor 166 may invoke one or more of these executors, alone or in any combination. In some implementations, each of the validation rules corresponds to a particular target device or type of target device. Rule executor 166 may execute the validation rules to determine, based on the target device, whether the parameters are valid for the operation that is to be performed by the target device. For example, rule executor 166 may, based on a validation rule, identify a target device, and use the validation rule to determine whether parameters are valid for the target device identified by the validation rule.

Figure 1D:
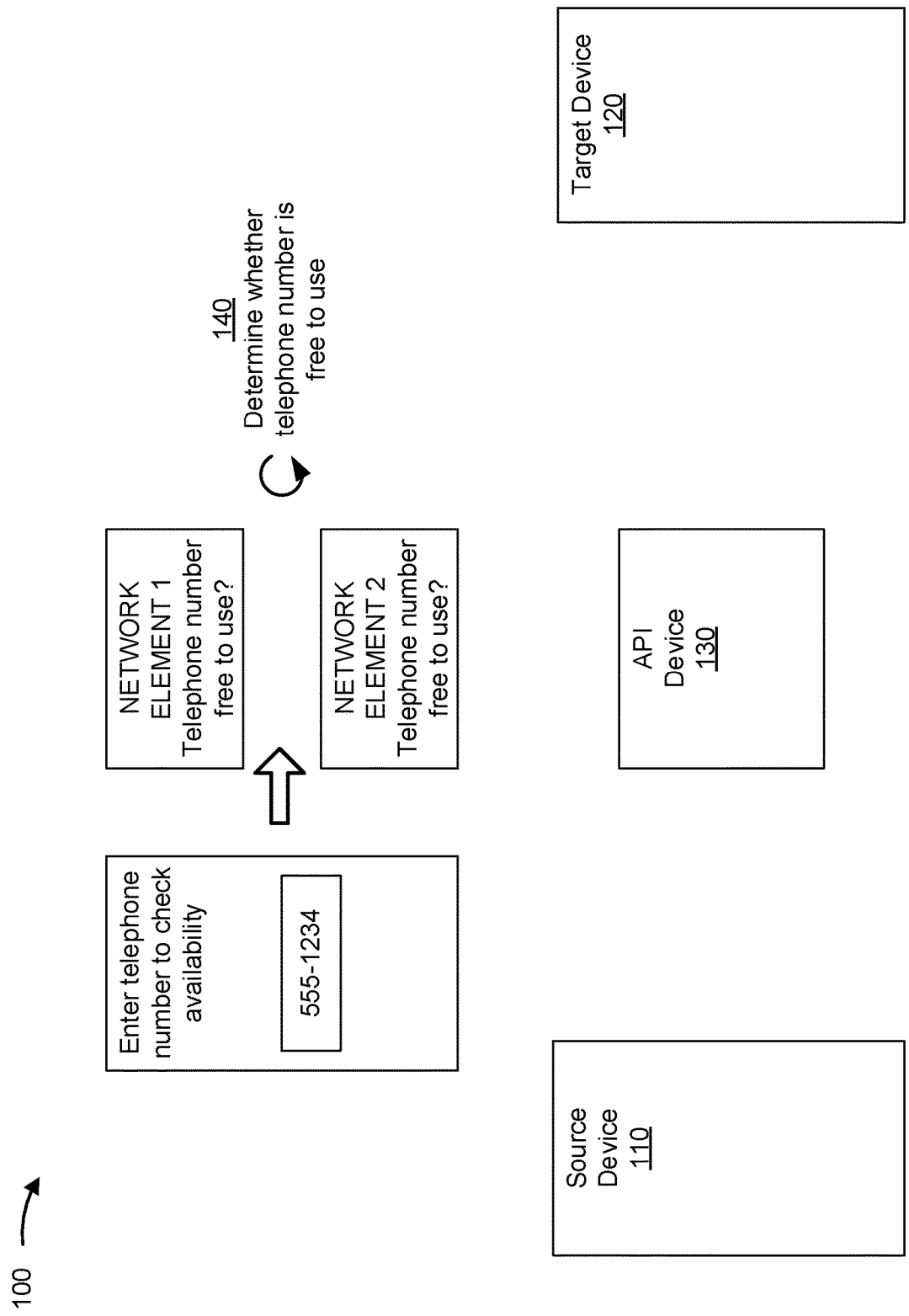
Figure 1E:
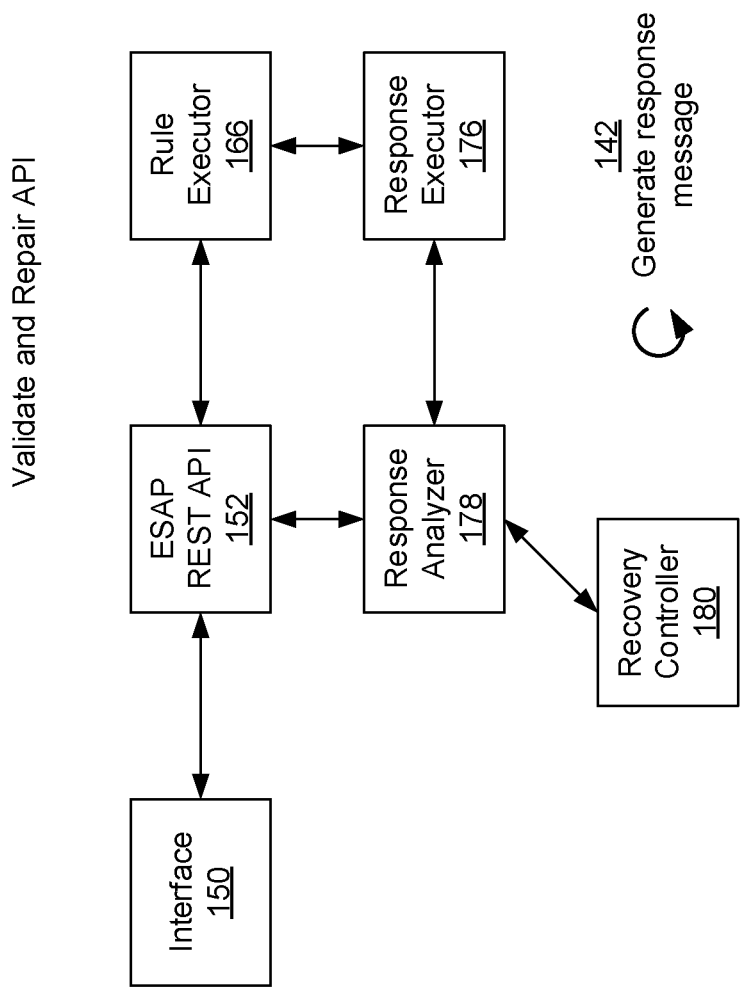
Figure 1F:
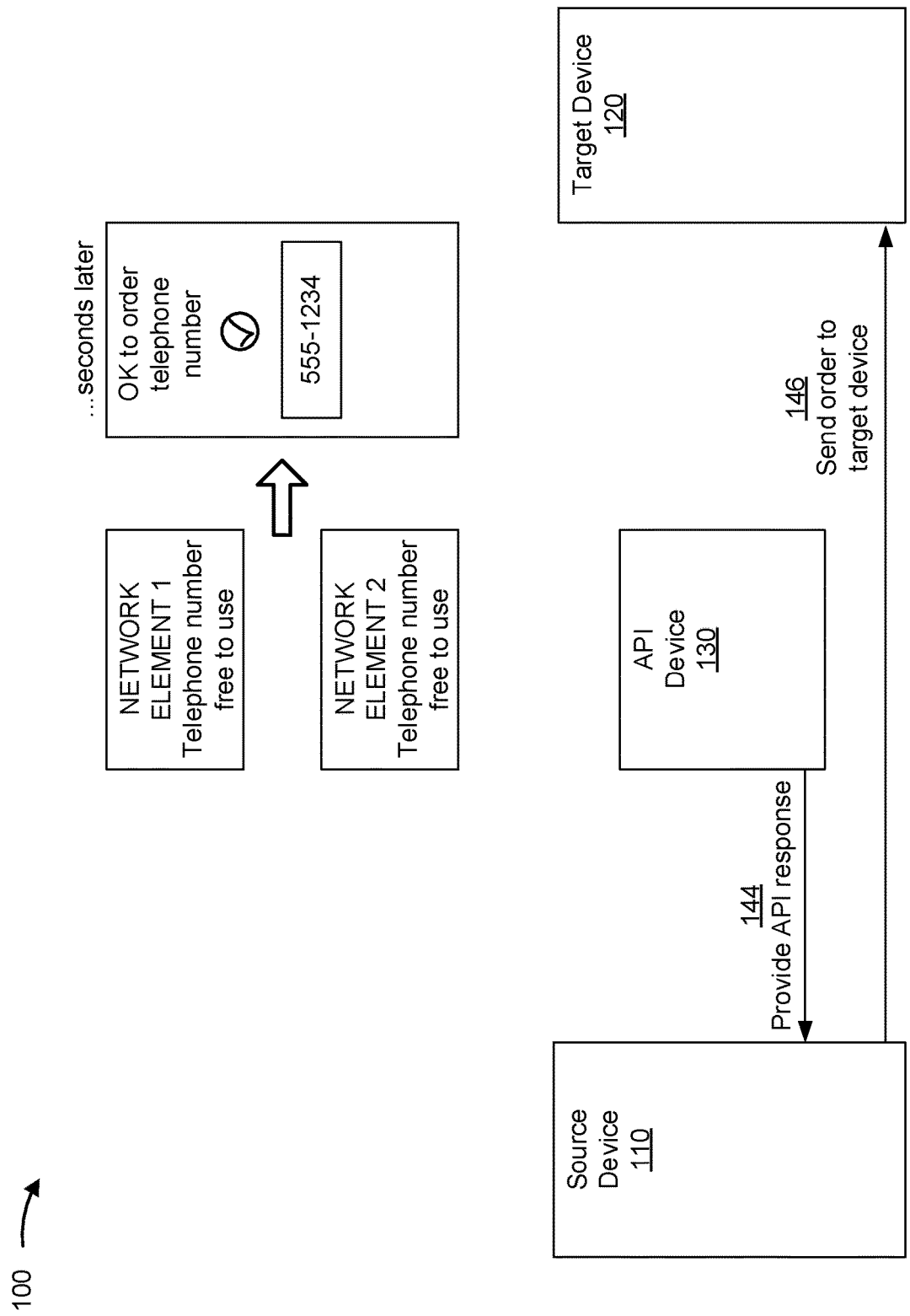

As shown by FIG. 1D, and by reference number 140, the API may use validation rules, for example, to query databases of multiple network elements as to whether the databases indicate use of the telephone number. As shown by FIG. 1E, and by reference number 142, the API may use a response executor 176 to generate a response message, based on executing the validation rules. The API may provide this response message to a response analyzer 178. Response analyzer 178 may determine if the parameter is valid for the operation to be performed by the target device 120. If the parameter is valid, the API may provide a response message to source device 110 as shown by FIG. 1F, and by reference number 144. The API may send the response message via ESAP REST API 152 and interface 150, indicating that the parameter is valid. As shown by reference number 146, source device 110 may then send the order for provision of the telephone number to target device 120. This validation may take place almost immediately, without wasting networking and processing resources of target device 120 if target device 120 were to perform the operation with an invalid telephone number.

Returning to FIG. 1E, if the parameter (telephone number in this example) is not valid, response analyzer 178 may invoke recovery controller 180. Recovery controller 180 may select, based on the source information and the operation information, a recovery rule from among multiple recovery rules. The API may use recovery controller 180 to execute the recovery rule to remedy an issue preventing the telephone number from being valid. Recovery controller 180 may provide a response message indicating a result of executing the recovery rule.

Figure 1G:
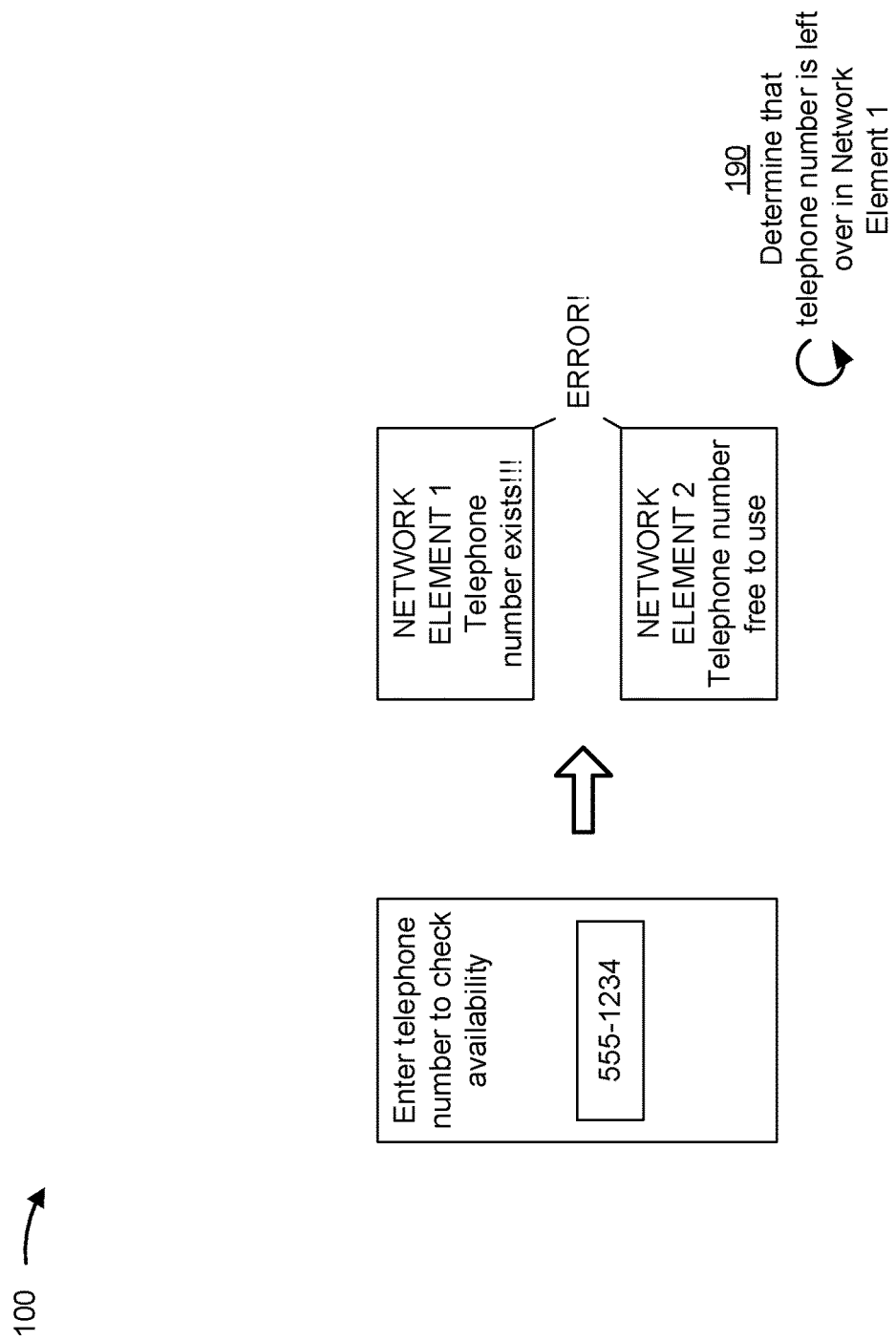

For example, as shown by FIG. 1G, and by reference number 190, the API may determine, based on executing the validation rules (e.g., database queries to network elements), that there is a discrepancy between information in a database of network element 1 and information in a database of network element 2. These databases may be databases used by the provisioning system. In this example, network element 1 may indicate that the telephone number exists in an active use database, but network element 2 may indicate that the telephone number is not in an active use database. This is an error that recovery controller 180 may remedy. Recovery controller 180 may recognize that there is a leftover record for the telephone number in the active use database of network element 1. The telephone number may not have been disconnected properly. The API uses recovery controller 180 to select a recovery rule that corresponds to resolving the discrepancy. The recovery rule may call for deletion of the leftover record from the database of network element 1. In some implementation, each recovery rule corresponds to a target device or type of target device. For example, a process for parameter deletion for a network element associated with one target device may differ from such a process for network elements associated with another target device or type of target device.

Figure 1H:
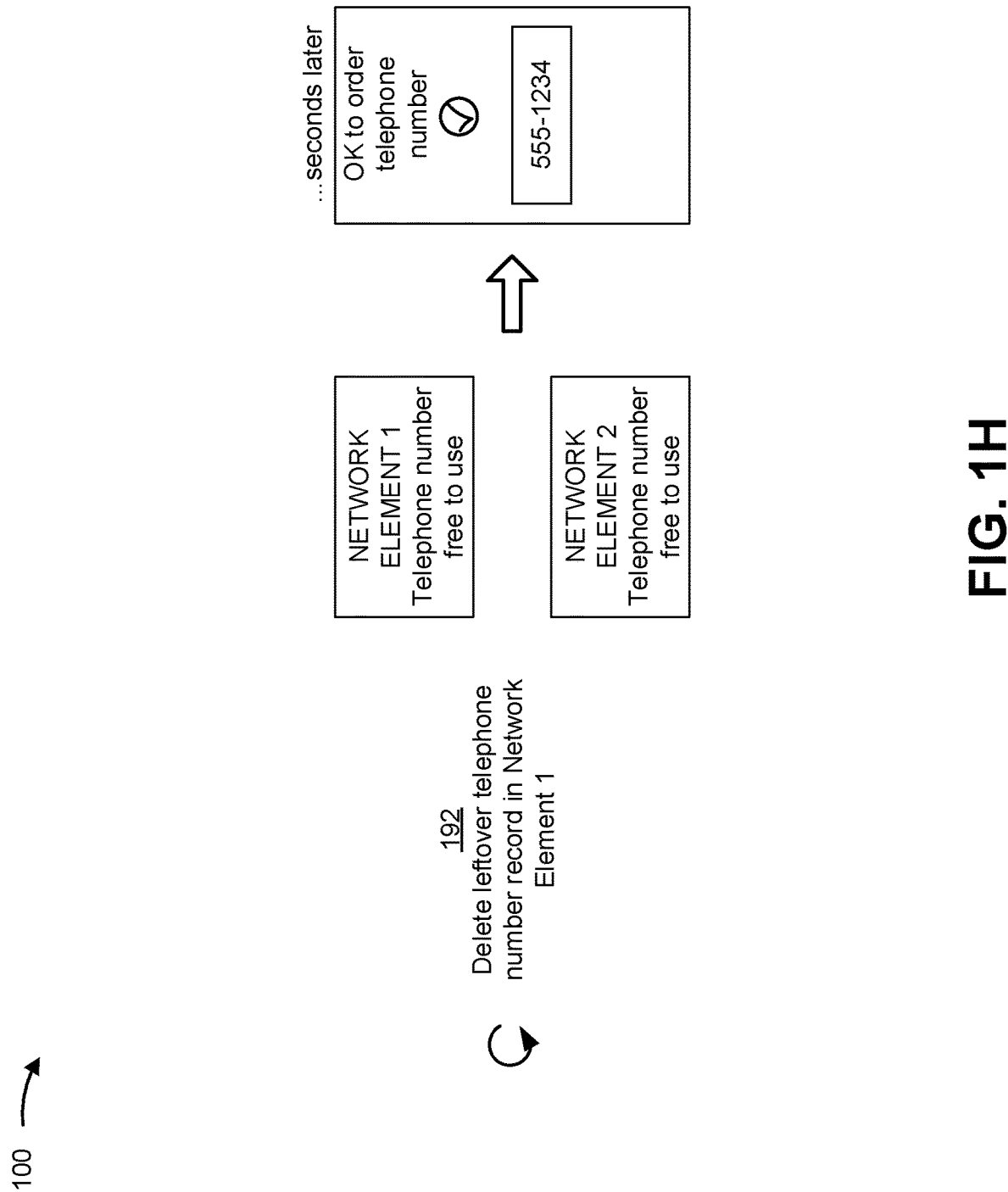

As shown by FIG. 1H, and by reference number 192, the API uses recovery controller 180 to delete the leftover record from the database of network element 1. This validation and recovery may take place almost immediately, or in just seconds. In some implementations, if the discrepancy cannot be cleared up, a response message may indicate that a new telephone number may be acquired from a numbering management system. In some cases, acquisition of a new telephone number and/or validation of the new telephone number may be automatic (e.g., without requiring human input).

In some implementations, recovery controller 180 may be configured with recovery rules that correspond to errors. For example, recovery controller 180 may include a database with errors and one or more recovery rules that are linked to the errors. Additionally, or alternatively, recovery controller 180 may learn recovery rules that correspond to certain errors. For example, recovery controller 180 may use machine learning to determine which recovery rules resolve the errors and which recovery rules do not resolve the errors. Recovery controller 180 may record links between the errors and the recovery rules that resolve the errors. In some cases, recovery controller 180 may form new recovery rules based on related recovery rules that resolved related errors.

API device 130 may configure the API to be flexible. For example, API device 130 may add validation rules or access to validation rules that correspond to new types of source devices, target devices, and/or operations. For example, a new type of source device may be a new customer site that will be ordering a new operation, the new operation being setup of a new voice over internet protocol (VOIP) enterprise system by the target device (or another target device). New validation rules may be added by API device 130 for validating parameters for setting up the new VOIP enterprise system by the target device, before the target device performs the operation. These new validation rules may be, for example, a rule to validate a proposed enterprise name, a rule to validate user identification, a rule to validate credit history information, and/or the like. In some implementations, API device 130 may use these same validation rules later for a request from another customer site (same type of source device) to validate parameters for another new enterprise system.

API device 130 may also add recovery rules or access to recovery rules that correspond to new types of source devices, target devices, and/or operations. In some implementations, all rules may be configured in a database accessible to the API and configured based on rule type. A database schema for the database may vary based on the operation, the source system, parameters from a source device of the source system, and/or the target system (e.g., provisioning system). API device 130 may add validation rules and/or recovery rules without changing production code. This increased flexibility saves networking and processing resources that would be spent on a request with parameters that have not been validated, remedying any issue and reexecuting the validation rules.

In some implementations, developers may configure API device 130 with the API or any new APIs that may correspond to other operations for the target system or other target systems. The developers may have information about source systems, a particular target system, and source parameter requirements that are required for an operation to be performed on the particular target system. Developers may create validation and recovery rules for the API or for any new APIs, based on the information about the requirements. Developers may also coordinate access to target system data for validation purposes. Once the developers configure an API on API device 130, the API may perform validation instead of the target system.

API device 130 may add validation and recovery rules to an API so that the developers do not need to add the rules to production software in a target system, which may span multiple components and involve more complex software. Updating the API rather than the multiple systems in a target system may save processing and network resources.

In some implementations, the request may invoke the API with a call such as "API Name: doValidateAndRepair (ArrayList<validationReqObj>)". Input validationReqObj is an object that may include one or more parameters, source information that identifies source device 110, and operation information that identifies the operation. This object may be in a format of a JavaScript® Object Notation (JSON) object. An example format of a request may be as follows:

JSON: validationReqObj
List<validationAttributes>,
String entityName,
String entityId,
String sourceName
}
validationAttribute{string paramName, String paramValue}

Each validationAttribute in the object may be a parameter. For example, paramName may be "telephone number," and paramValue may be an actual telephone number "555-555-1234." The entityName may represent an operation. For example, entityName may be "telephone number" so as to mean provision of a telephone number. The operation may be more specific, as to indicate a telephone number for a particular customer. Input entityId may indicate a customer site or location identity. Input sourceName may indicate the source device and/or information about a source system.

An example format of a response message may be as follows:

validationRespObj {
ResponseObj responseObj;
List<ResponseObj>
}

A response object may include information as follows:

ResponseObj {string response_code,
String responseValue,
String response_description,
enum <summary, detail>
}

Output response_code may be a unique code (e.g., 001) that is based on the source system and/or the operation. Output responseValue may indicate success or failure. In the case of failure, response_description may provide further description of the failure. This may also include a code or a value.

As indicated above, FIGS. 1A-1H are provided as one or more examples. Other examples can differ from what is described with regard to FIGS. 1A-1H. For example, target device 120 may be part of an online telephone ordering system. In some implementations, target device 120 may be part of a different type of provisioning system. The provisioning system may not be limited to telecommunications. The provisioning system may be any other system that will process requests for products or services. For example, target device 120 may be part of an e-commerce system.

Figure 2:
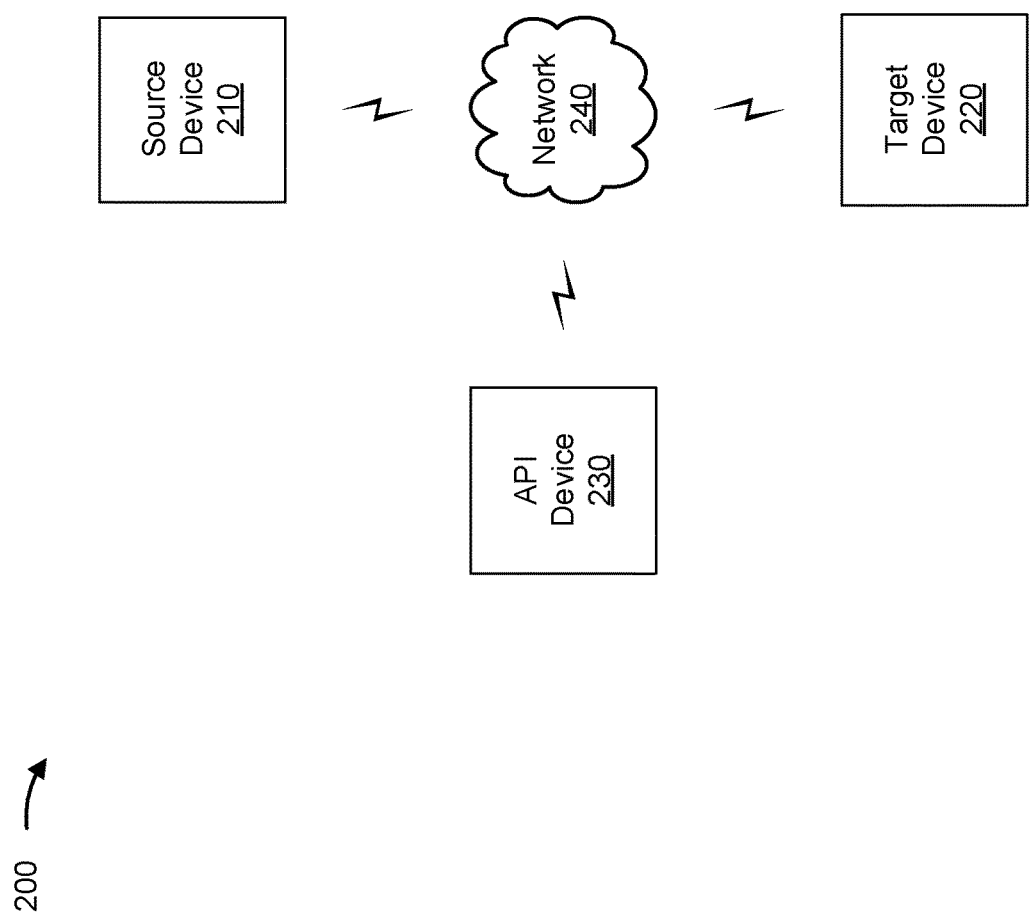
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a source device 210, a target device 220, an API device 230, and a network 240. Devices of environment 200 may interconnect via wired connections, wireless connections, or a combination of wired and wireless connections.

Source device 210 (of a source system) includes one or more devices capable of receiving, generating, storing, processing, and/or providing information associated with providing a request that invokes an API to validate parameters for an operation to be performed on target device 220, as described above. For example, source device 210 may include a communication and/or computing device, such as a mobile phone (e.g., a smart phone, a radiotelephone, etc.), a laptop computer, a tablet computer, a handheld computer, a desktop computer, a server, a server farm, a desktop computer, a mainframe computer, a cloud computing environment, a distributed computing environment, or a similar type of device.

Target device 220 (of a provisioning system) includes one or more devices capable of receiving, generating, storing, processing, and/or providing information associated with performing the operation requested by source device 210. For example, target device 220 may include a communication and/or computing device, such as a server, a server farm, a desktop computer, a mainframe computer, a cloud computing environment, a distributed computing environment, or a similar type of device.

API device 230 includes one or more devices capable of receiving, generating, storing, processing, and/or providing information associated with executing an API to validate parameters for the operation to be performed on target device 220, as described above. For example, API device 230 may include a communication and/or computing device, such as a mobile phone (e.g., a smart phone, a radiotelephone, etc.), a laptop computer, a tablet computer, a handheld computer, a desktop computer, a server, a server farm, a desktop computer, a mainframe computer, a cloud computing environment, a distributed computing environment, or a similar type of device.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200. FIG. 2 is provided as an example. Other examples can differ from what is described with regard to FIG. 2.

Figure 3:
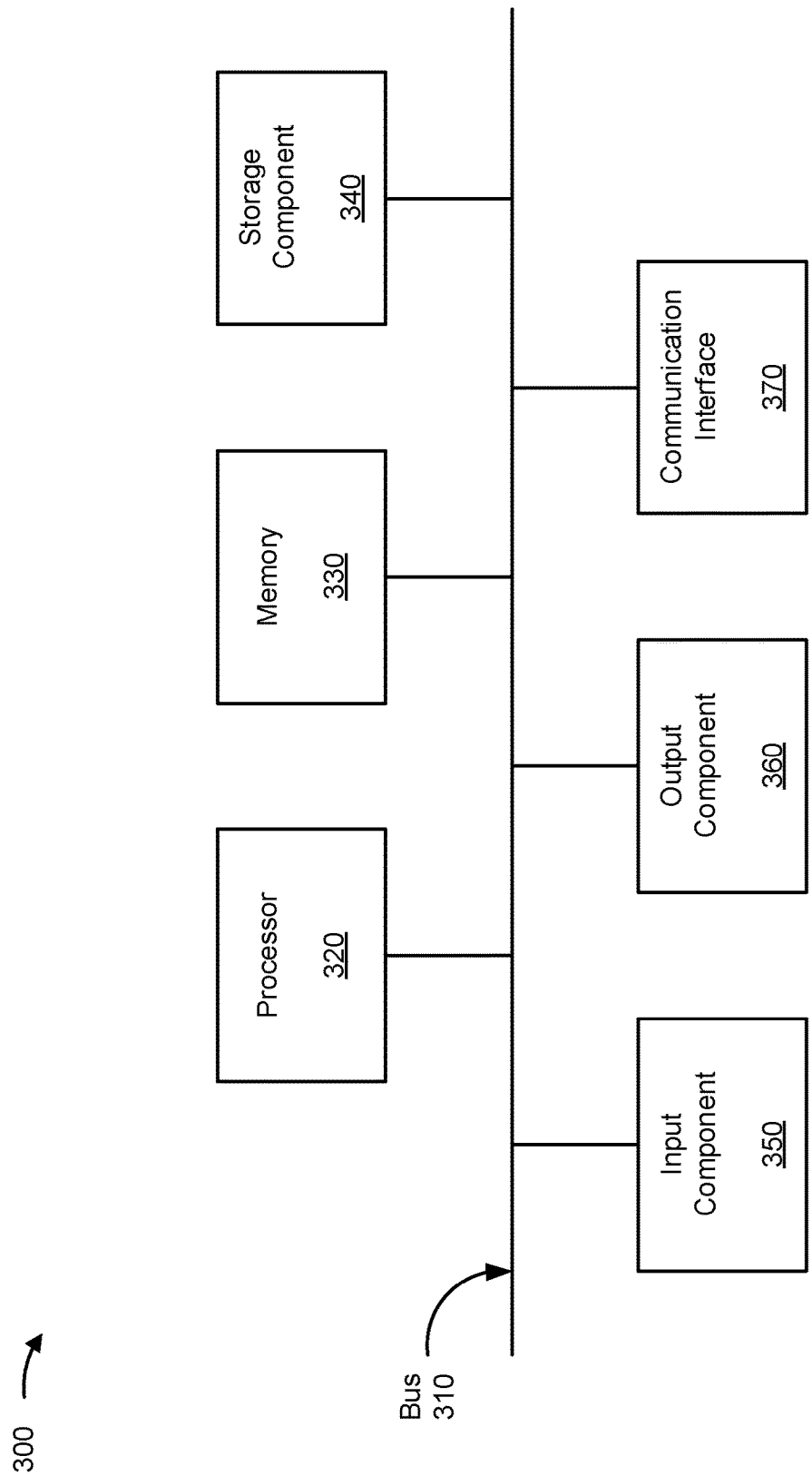
FIG. 3 is a diagram of example components of one or more devices of FIG. 2.

FIG. 3 is a diagram of example components of a device 300. Device 300 may correspond to source device 210, API device 230, and/or target device 220. In some implementations, source device 210, API device 230, and/or target device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for using a uniform application program interface (API) for validating parameters of a source device for an operation on a target device. In some implementations, one or more process blocks of FIG. 4 may be performed by a device (e.g., API device 230). In some implementations, one or more process blocks of FIG. 4 may be performed by another device or a group of devices separate from or including the device, such as a device in a source system (e.g., source device 210), a device in a provisioning system (e.g., target device 220), and/or the like.

As shown in FIG. 4, process 400 may include receiving, from a source device, a request that invokes an API to be executed on the device, the API being configured to determine whether one or more parameters of the source device are valid for an operation to be performed by a target device. The operation may be to provide, for example, a voice over internet protocol (VOIP) service, wherein the request includes the one or more parameters, source information that identifies the source device, and operation information that identifies the operation (block 410). For example, the device (e.g., using processor 320, memory 330, storage component 340, input component 350, output component 360, communication interface 370, and/or the like) may receive, from a source device, a request that invokes an API to be executed on the device, as described above. In some implementations, the API may be configured to determine whether one or more parameters of a source device are valid for an operation to be performed by a target device to provide a VOIP service. In some implementations, the request may include the one or more parameters, source information that identifies the source device, and operation information that identifies the operation.

As further shown in FIG. 4, process 400 may include converting, based on the source information, the one or more parameters from the source device to one or more API parameters that are in a format to be used for execution by the API (block 420). For example, the device (e.g., using processor 320, memory 330, storage component 340, input component 350, output component 360, communication interface 370, and/or the like) may convert, based on the source information, the one or more parameters from the source device to one or more API parameters that are in a format to be used for execution by the API, as described above.

In some implementations, alone or in combination with one or more other implementations, converting the one or more parameters comprises selecting a parameter map from among a plurality of parameter maps. In some implementations, each of the plurality of parameter maps corresponds to a respective type of source device. Process 400 may further comprise adding a new parameter map to the plurality of parameter maps, the new parameter map corresponding to a type of source device that is new to the plurality of parameter maps.

In some implementations, alone or in combination with one or more other implementations, process 400 further comprises determining, based on the operation information, whether the one or more parameters include a parameter required for the operation and providing an error message to the source device based on determining that the one or more parameters do not include the parameter required for the operation. In some cases, there may be multiple parameters required for the operation and all of the multiple parameters that are required must be included in the request to proceed with execution of the validation rules.

As further shown in FIG. 4, process 400 may include selecting, based on the source information and the operation information, one or more validation rules from among a plurality of validation rules, wherein each of the plurality of validation rules specifies how to determine whether the one or more API parameters are valid for the operation (block 430). For example, the device (e.g., using processor 320, memory 330, storage component 340, input component 350, output component 360, communication interface 370, and/or the like) may select, based on the source information and the operation information, one or more validation rules from among a plurality of validation rules, as described above. In some implementations, each of the plurality of validation rules specifies how to determine whether the one or more API parameters are valid for the operation, as described above. In some implementations, each of the plurality of validation rules corresponds to a respective type of source device.

As further shown in FIG. 4, process 400 may include executing the one or more validation rules to determine, based on the target device, whether the one or more API parameters are valid for the operation (block 440). For example, the device (e.g., using processor 320, memory 330, storage component 340, input component 350, output component 360, communication interface 370, and/or the like) may execute the one or more validation rules to determine, based on the target device, whether the one or more API parameters are valid for the operation, as described above.

In some implementations, alone or in combination with one or more other implementations, selecting the one or more validation rules comprises selecting the one or more validation rules from among a plurality of validation rules. In some cases, each of the plurality of validation rules corresponds to a respective type of source device. In some cases, selecting the one or more validation rules comprises selecting the one or more validation rules and the one or more recovery rules from among database rules, representational state transfer (REST) rules, simple object access protocol (SOAP) rules, and/or Oracle® call interface (OCI) rules. In some cases, all rules may be configured in a database accessible to the API and configured based on rule type.

In some implementations, alone or in combination with one or more other implementations, executing the one or more validation rules comprises invoking a database query, invoking a REST call, invoking a simple object access protocol (SOAP) call, and/or invoking an Oracle® call interface (OCI) call to determine whether the one or more API parameters are valid for the operation.

Process 400 may further comprise adding a new validation rule to the plurality of validation rules, the new validation rule corresponding to a type of source device that is new to the plurality of validation rules.

As further shown in FIG. 4, process 400 may include, based on determining, from executing the one or more validation rules, that an issue is preventing the one or more API parameters from being valid for the operation, selecting, based on the source information and the operation information, a recovery rule from among a plurality of recovery rules, and executing the recovery rule to remedy the issue (block 450). For example, the device (e.g., using processor 320, memory 330, storage component 340, input component 350, output component 360, communication interface 370, and/or the like) may, based on determining, from executing the one or more validation rules, that an issue is preventing the one or more API parameters from being valid for the operation, selecting, based on the source information and the operation information, a recovery rule from among a plurality of recovery rules, and executing the recovery rule to remedy the issue, as described above.

In some implementation, alone or in combination with one or more other implementations, process 400 further comprises adding a new recovery rule to the plurality of recovery rules, the new recovery rule corresponding to a type of source device that is new to the plurality of recovery rules.

In some implementations, alone or in combination with one or more other implementations, process 400 further comprises reexecuting, based on determining that an issue is preventing the one or more API parameters from being valid for the operation, the one or more validation rules to determine whether the one or more API parameters are valid for the operation. This may include generating, based on reexecuting the one or more validation rules, a response message to indicate one of the one or more parameters corresponding to the one or more API parameters are valid for the operation, or a recovery action is required.

As further shown in FIG. 4, process 400 may include providing, to the source device and based on executing the recovery rule, a response message indicating a result of executing the recovery rule (block 460). For example, the device (e.g., using processor 320, memory 330, storage component 340, input component 350, output component 360, communication interface 370, and/or the like) may provide, to the source device and based on executing the recovery rule, a response message indicating a result of executing the recovery rule, as described above.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from a source device, a request that invokes an application program interface (API) to be executed on the device,
wherein the request includes one or more parameters and operation information that identifies an operation to be performed by a target device;
selecting, by the API and based on the operation information, one or more validation rules from among a plurality of validation rules,
wherein the one or more validation rules specifies how to determine whether the one or more parameters are valid for the operation;
executing, by the API, the one or more validation rules to determine, based on the target device, whether the one or more parameters are valid for the operation;
based on determining, from executing the one or more validation rules, that an issue is preventing the one or more parameters from being valid for the operation, selecting, by the API and based on the operation information, a recovery rule from among a plurality of recovery rules, and executing, by the API, the recovery rule to remedy the issue; and
providing, by the device, to the source device, and based on executing the recovery rule, a response message indicating a result of executing the recovery rule.

2. The method of claim 1, further comprising:
determining, by the API and based on the operation information, whether the one or more parameters include a parameter required for the operation; and
providing an error message to the source device based on determining that the one or more parameters do not include the parameter required for the operation.

3. The method of claim 1, further comprising:
reexecuting, by the API and based on determining that an issue is preventing the one or more parameters from being valid for the operation, the one or more validation rules to determine whether the one or more parameters are valid for the operation; and
generating, based on reexecuting the one or more validation rules, a response message to indicate one of:
the one or more parameters are valid for the operation, or
a recovery action is required.

4. The method of claim 1, further comprising:
converting, by the API, the one or more parameters from a source device format to a format to be used for execution by the API.

5. The method of claim 4, wherein converting the one or more parameters comprises selecting a parameter map from among a plurality of parameter maps, and wherein each of the plurality of parameter maps corresponds to a respective type of source device.

6. The method of claim 1, wherein selecting the one or more validation rules comprises selecting the one or more validation rules from among a plurality of validation rules, and wherein each of the plurality of validation rules corresponds to a respective type of source device.

7. The method of claim 6, further comprising adding a new validation rule to the plurality of validation rules, the new validation rule corresponding to a type of source device that is new to the plurality of validation rules.

8. The method of claim 1, wherein each of the plurality of validation rules corresponds to a respective type of source device.

9. The method of claim 8, further comprising adding a new recovery rule to the plurality of recovery rules, the new recovery rule corresponding to a type of source device that is new to the plurality of recovery rules.

10. The method of claim 1, wherein executing the one or more validation rules comprises invoking a database query to determine whether the one or more parameters are valid for the operation.

11. The method of claim 1, wherein executing the one or more validation rules comprises invoking a representational state transfer (REST) call to determine whether the one or more parameters are valid for the operation.

12. The method of claim 1, wherein executing the one or more validation rules comprises invoking a simple object access protocol (SOAP) call to determine whether the one or more parameters are valid for the operation.

13. The method of claim 1, wherein executing the one or more validation rules comprises invoking an Oracle® call interface (OCI) call to determine whether the one or more parameters are valid for the operation.

14. The method of claim 1, wherein the operation to be performed by the target device is a voice over internet protocol (VOIP) service.

15. A device, comprising:
one or more memories; and
one or more processors, communicatively coupled to the one or more memories, configured to:
receive, from a source device, a request to determine whether one or more parameters are valid for an operation to be performed by a target device,
wherein the request includes the one or more parameters and operation information that identifies the operation;
select, based on the operation information, one or more validation rules from among a plurality of validation rules and one or more recovery rules from among a plurality of recovery rules;
execute the one or more validation rules to determine, based on the target device, whether the one or more parameters are valid for the operation;
based on a determination that an issue is preventing the one or more parameters from being valid for the operation, execute the one or more recovery rules to remedy the issue;
generate a response message indicating a result of executing the one or more validation rules and executing the one or more recovery rules; and
provide the response message to the source device.

16. The device of claim 15, wherein the request is a representational state transfer (REST) message.

17. The device of claim 15, wherein the one or more processors are configured to convert the one or more parameters into a format for executing the one or more validation rules.

18. The device of claim 15, wherein the one or more processors are configured to select the one or more validation rules and the one or more recovery rules from among database rules, representational state transfer (REST) rules, simple object access protocol (SOAP) rules, and/or Oracle® call interface (OCI) rules.

19. A non-transitory computer-readable medium storing instructions, the instructions comprising:
one or more instructions that, when executed by one or more processors of a device, cause the one or more processors to:
receive, from a source device, a request that invokes an application program interface (API) to be executed on the device,
wherein the request includes one or more parameters and operation information that identifies an operation;
select, based on the operation information, one or more validation rules from among a plurality of validation rules,
wherein the one or more validation rules specifies how to determine whether the one or more parameters are valid for the operation;
execute the one or more validation rules to determine, based on a target device, whether the one or more parameters are valid for the operation;
generate a response message indicating a result of executing the one or more validation rules; and
provide the response message to the source device.

20. The non-transitory computer-readable medium of claim 19, wherein the operation comprises providing a new telephone number or a new domain name to the source device.

* * * * *